E. DÖNITZ.
HINGED DOUBLE TELESCOPE.
APPLICATION FILED MAR. 19, 1908.

922,679.

Patented May 25, 1909.

Witnesses:
Paul Krüger
Fritz Sander

Inventor:
Emil Dönitz

UNITED STATES PATENT OFFICE.

EMIL DÖNITZ, OF JENA, GERMANY, ASSIGNOR TO THE FIRM OF CARL ZEISS, OF JENA, GERMANY.

HINGED DOUBLE TELESCOPE.

No. 922,679.     Specification of Letters Patent.     Patented May 25, 1909.

Application filed March 19, 1908. Serial No. 422,122.

*To all whom it may concern:*

Be it known that I, EMIL DÖNITZ, a citizen of the German Empire, and residing at Carl-Zeiss strasse, Jena, in the Grand Duchy of Saxe-Weimar, Germany, have invented a new and useful Hinged Double Telescope, of which the following is a specification.

The invention relates to similar double telescopes as those patented May 5, 1908 under No. 886,436. One of the features of the said patent involves the appliance, which secures both single telescopes from sinking down and thereby losing their adjustment to any inter-pupilary distance, being automatically readjusted along with any variation of that adjustment of the telescopes. Springs were proposed in that patent as such securing appliances or as essential parts of them. According to the present improvement the same service is performed by a locking mechanism, for instance, a ratchet or friction device, which in adjustment of the telescopes is opened and closed automatically. Such a contrivance has the advantage over the automatic securing spring, that a certain amount of hinge friction is no longer necessary in order to complete the securing effect. If a spring ratchet device with suitably faced teeth be employed, the shifting of its parts relatively to one another caused by adjustment of the single telescopes effects opening and closing of the ratchet device, each time the shifting by one tooth occurs. Locking mechanisms of other kinds allow of securing appliances being produced, in which opening and closing are only effected at the beginning and at the end of the adjustment of the single telescopes, that is, in grasping and leaving hold of these telescopes. In order to effect this, a lever for opening and a spring for closing the locking mechanism are suitably arranged.

Figures 1, 2:
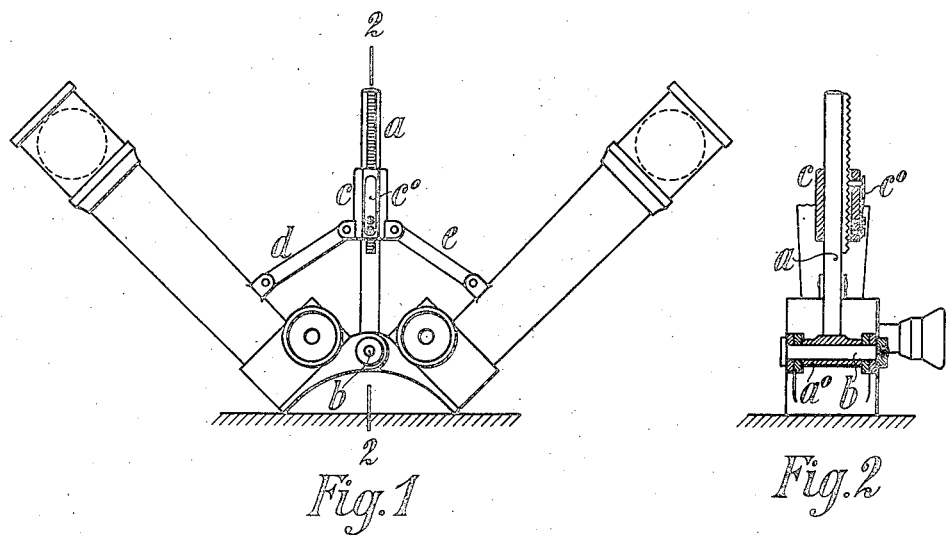
Figure 3:
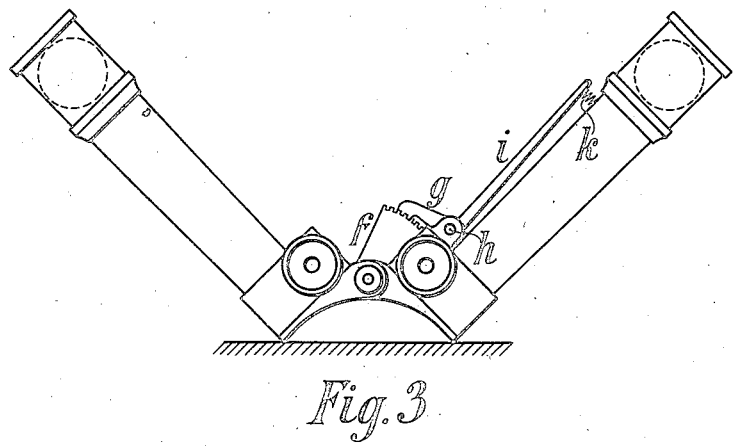
Figure 4:
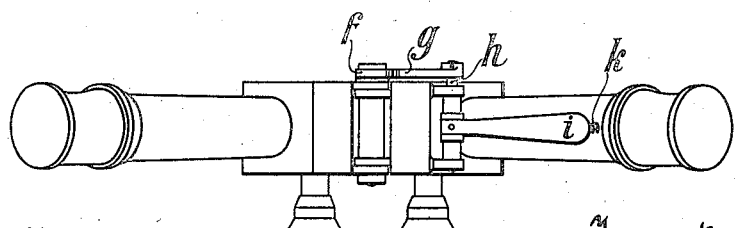

In the annexed drawing: Figure 1 is a front view of a hinged double telescope fitted with a locking mechanism according to the invention. Fig. 2 is a section along the line 2—2 of Fig. 1. Fig. 3 is a front view of the same hinged double telescope, but fitted with another locking mechanism according to the invention. Fig. 4 is a plan view of the telescope according to Fig. 3.

The arrangement according to Figs. 1 and 2 shows an automatic spring ratchet device as the locking mechanism. A toothed upright $a$, which has its foot $a^0$ standing on the hinge pin $b$ of the double telescope, serves as the one main part of the ratchet device. A sleeve $c$, guided upon the upright $a$, with a spring catch $c^0$ attached thereto and two links $d$ and $e$ coupling the two single telescopes to the sleeve $c$ form the other part of the ratchet device. Because of the suitably sloping faces provided not only on the teeth of the upright but also on the tooth of the catch, this tooth is successively forced out of the tooth spaces in the upright, into which it enters one after another in consequence of the action of the catch spring, when the sleeve $c$ undergoes a displacement up or down by adjusting the single telescopes.

The second arrangement according to Figs. 3 and 4 shows a spring ratchet device with a releasing lever. A toothed sector $f$ is firmly connected with the casing of the left telescope, while the free end of a short arm $g$ of a bell crank lever hinged to the right single telescope is fitted with catch teeth. From the axis $h$ of said lever a longer arm $i$ extends along the casing of the right single telescope. A spring $k$ presses the arm $i$ away from the casing, by which action the ratchet device $fg$ is closed. Grasping the single telescopes each with one hand, the right one presses the arm $i$ down upon its spring $k$, so that the ratchet device is opened and the single telescopes may be adjusted to the inter-pupilary distance. Leaving hold of the single telescopes after this adjustment closes the ratchet device again.

I claim:

1. The combination, with a double telescope adapted to be used on a supporting device and comprising two single telescopes hinged together for adjustment to the inter-pupilary distance, of a locking mechanism, independent of the supporting device, for securing said telescopes in their adjusted position.

2. The combination, with a double telescope adapted to be used on a supporting device and comprising two single telescopes hinged together for adjustment to the interpupilary distance, of a spring ratchet mechanism, independent of the supporting device, for securing said telescopes in their adjusted position, one part of the said ratchet mechanism being fitted to one and the other to the other single telescope and the ratchet teeth having sloping faces.

EMIL DÖNITZ.

Witnesses:
 PAUL KRÜGER,
 FRITZ SANDER.